April 12, 1932. E. G. BERGLUND 1,853,032
AUTOMOBILE BED
Filed Feb. 19, 1931
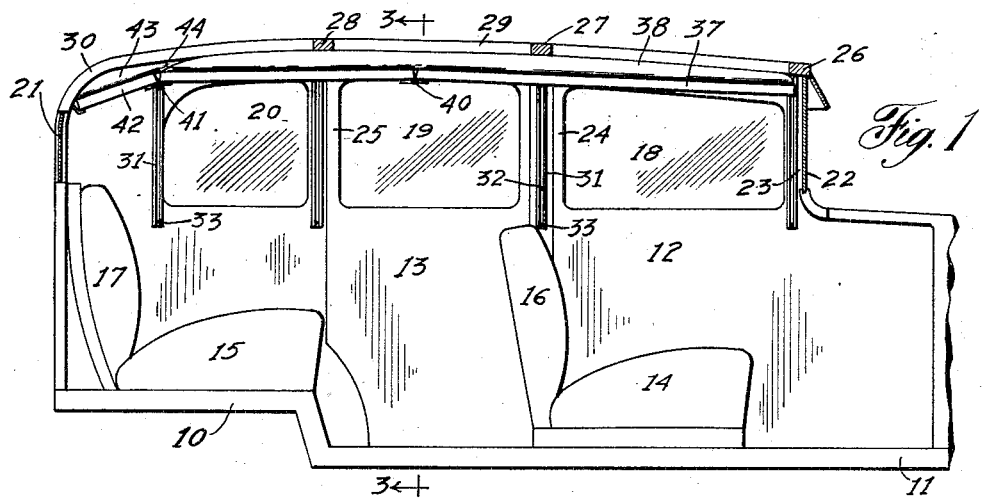
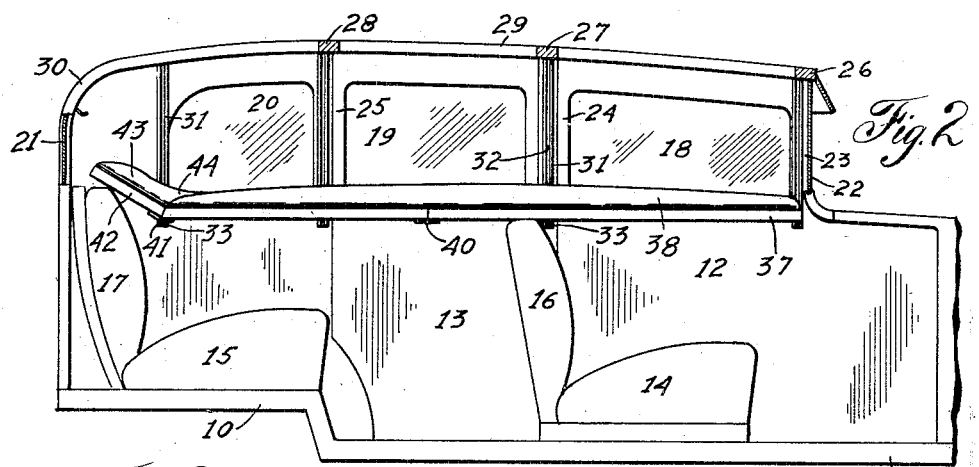
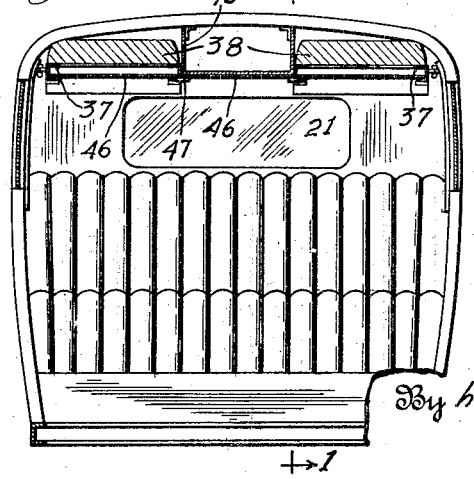
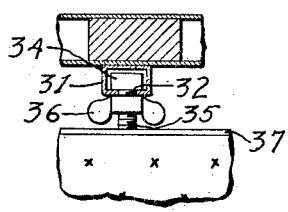
Inventor
Einar G. Berglund
By his Attorney
Warren E. Willis.

Patented Apr. 12, 1932

1,853,032

UNITED STATES PATENT OFFICE

EINAR G. BERGLUND, OF RICHMOND HILL, NEW YORK

AUTOMOBILE BED

Application filed February 19, 1931. Serial No. 516,927.

This invention relates to beds as incorporated in automobiles whereby the vehicle may be used for sleeping purposes at will.

It very often occurs that passengers, traveling considerable distance, prefer the privacy and comfort of their own car to stopping at a hotel and its attendant costs, and not always a hotel is to be found.

It further happens that by accident or otherwise is is impossible to reach such accommodations, in which case the passengers are obliged to undergo the discomfort of sitting for perhaps a considerable period of time.

Having these matters in mind it is an object of the present invention to provide a pair of single beds, normally held snugly against the roof of the car unobtrusively and unobjectionably, in nowise interfering with the seats and ordinary functions of a car, and which may be readily lowered into a position convenient for use at will.

A further feature is in the provision of twin beds, arranged one at each side of the car and having ample space therebetween for entry, no steps or other devices being required.

These several advantageous objects are accomplished by the novel construction, combination and arranged of parts herinafter described and shown in the annexed drawings, constituting a material part of this disclosure, and in which:—

Figure 1 is a partial side elevational, partial sectional view of a conventional type of car, showing the bed as raised closely under the roof, the section being taken on line 1—1 of Figure 3.

Figure 2 is a similar view of the same parts, but showing one of the beds in its lowered, operative position.

Figure 3 is a transverse sectional view taken on line 3—3 of Figure 1.

Figure 4 is a fragmentary sectional view showing details of construction.

The body of a conventional type of car, generally designated by the numeral 10, has at its front a portion of the engine housing 11 and is provided with two side doors 12—13 respectively at the front and rear.

Two seats 14—15 are provided with backs 16—17 and a series of windows 18, 19 and 20 provide for light and ventilation, beside a rear window 21 over the back of the rear seat and a wind shield 22 at the front, all these several parts being of the usual and well known type of construction.

Between the several windows, and at the front corners, are fixed uprights 23, 24 and 25, their upper ends being connected by transverse roof beams 26, 27 and 28 supporting the roof 29, the same being curved at its side edges to blend into the side walls of the car.

A similar curve 30 at the rear connects the roof with the rear wall containing the window 21.

Fixed on the inner sides of the uprights 23, 24 and 25, and also at points rearward of the last window 20, are upright channels 31, their lower ends extending to a plane essentially level with the tops of the seat backs 16—17, these channels being flanged inwardly at their inner faces to present slots 32.

Fixed on the lower ends of the channels are stops 33 and slidably engaged in the channels are blocks 34 from which extend threaded stems 35 provided with wing nuts 36 for convenience in operation.

The opposite ends of the stems 35 are rigidly fixed in one of the limbs of a rolled angle 37, constituting one of the elements of a rectangular bed frame and which may be provided with a woven wire mattress, over which is disposed any preferred type of cushion mattress 38.

As the full interior width of a common car is approximately 56 inches, each of the bed frames and mattresses may be approximately 18 inches in width and the full length of a car, substantially 6 feet inside measurement, thus leaving a free intervening space of about 20 inches.

When the beds are lowered into operative position the frames may partially rest on the back of the forward seat as seen in Figure 2, and when raised will make intimate contact with the car roof, as shown in Figure 1.

When in either position they are securely held by proper manipulation of the nuts 36.

If preferred, to suit the beds to a sloping roof, a hinge joint 40 may be interposed in the length of the bed side frame elements and at the rear are other hinges 41 used to connect pillow carrying frames 42, of the same general description as the bed frames 37, the same being provided with pillows 43, their front edges having flaps 44 to partially overlie the bed mattresses adjacent.

These pillow frames, when the beds are extended for sleeping purposes, may rest upon the upper edge of the rear seat back 17, as in Figure 2, and when raised conform to the curvature 30 of the roof and rear wall as in Figure 1.

Midway between the bed frames a hollow channel like filler 45 may be interposed, its lower surface extending coincidentally with the bottoms of the bed frames, all parts having coverings 46 of the same material with which the car is upholstered, thus presenting no break in the continuity of the surfaces exposed.

If it is desired straps may be attached to the side edges of the filler channel 45 and adjustably engage the inner adjacent side frames of the beds.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. In combination with an automobile having seats, of a series of upright channels attached to the inner sides of the automobile frame supporting the roof thereof, blocks slidable in said channels, bed frames supported by said blocks, means carried by said blocks to clamp said bed frames adjustably to said channels and a filler attached to the roof of the automobile, the lower surfaces of said filler and bed frames being in the same plane when the bed frames are in a fully raised position.

2. In combination with an automobile having seats, of a series of upright channels attached to the inner sides of the automobile frame supporting the roof thereof, a pair of spaced bed frames adjustably connected to said channels, said bed frames when in one position resting on the backs of said seats and when in another position against the roof of the automobile, means carried by the roof of the automobile to fill the space between said bed frames when raised to present a substantially unbroken lower surface and means to secure said bed frames in either of their adjusted positions.

3. In combination with an automobile having seats, of a series of upright channels attached to the inner sides of the automobile frame supporting the roof thereof, a pair of spaced bed frames adjustably connected to said channels, said bed frames when in one position resting on the backs of said seats and when in another position against the roof of the automobile, means to clamp said bed frame in either position, pillow supporting frames hingedly attached to said bed frames, flaps extending from the pillow supporting frames over the adjacent edges of the bed frames, and stops carried by said channels to limit the lowering of said bed frames.

4. In combination with an automobile having seats, of a series of upright channels attached to the inner sides of the automobile frame supporting the roof thereof, a pair of spaced bed frames adjustably connected to said channels, to rest on the tops of the seat backs and to be raised against the roof of the automobile, a filler fixed to said roof to present its lower surface level with the bottoms of said bed frames, and an upholstered cover for the bottom surface of said frames and filler.

5. In combination with an automobile having seats, of a series of upright channels attached to the inner sides of the automobile frame supporting the roof thereof, a filler fixed longitudinally centrally of the roof of the automobile, bed frames adjustable on said channels to be raised against the roof on each side of said filler, and joints in the lengths of said bed frame permitting them to conform to the shape of the automobile roof.

6. In combination with an automobile having seats, of a series of upright channels attached to the inner sides of the automobile frame supporting the roof thereof, a filler fixed longitudinally centrally of the roof of the automobile, bed frames adjustable on said channels to be raised against the roof on each side of said filler, said frames having hinged joints in their lengths to conform to the roof, and pillow frames hinged to the rear ends of the bed frames to rest upon the backs of the rear seats when in operative position.

In testimony whereof I affix my signature.

EINAR G. BERGLUND.